United States Patent [19]

Smith et al.

[11] 4,123,947
[45] Nov. 7, 1978

[54] NON-METALLIC TRANSMISSION CHAIN

[75] Inventors: Larry C. Smith, New Berlin; Robert J. Webers, Racine, both of Wis.

[73] Assignee: Rexnord Inc., Milwaukee, Wis.

[21] Appl. No.: 828,051

[22] Filed: Aug. 26, 1977

[51] Int. Cl.² ............... F16G 13/02; B21L 13/00; B66F 7/06
[52] U.S. Cl. ................... 74/245 P; 59/9; 74/251 R; 254/74
[58] Field of Search ............ 59/7, 9; 254/74, 78; 74/245 P, 245 R, 251 R; 198/850

[56] References Cited
U.S. PATENT DOCUMENTS

| | | | |
|---|---|---|---|
| 3,127,980 | 4/1964 | Lanham | 198/850 |
| 3,234,807 | 2/1966 | Morin | 74/245 P |
| 3,281,121 | 10/1966 | Ratcliff | 254/167 |

FOREIGN PATENT DOCUMENTS 123,020  1946  Sweden .......................... 59/7

Primary Examiner—Leonard H. Gerin

[57] ABSTRACT

The present invention pertains to a non-metallic transmission chain for high loads which comprises a plurality of non-metallic links of a material having a tensile strength of at least 8500 psi and a plurality of associated glass fiber reinforced pins with a tensile strength of at least 1800 psi and flexure modulus of not less than 1,000,000 psi. The superior strength and qualities of the pin provide significant reduction in the undesired side arm flexing of the links.

7 Claims, 7 Drawing Figures

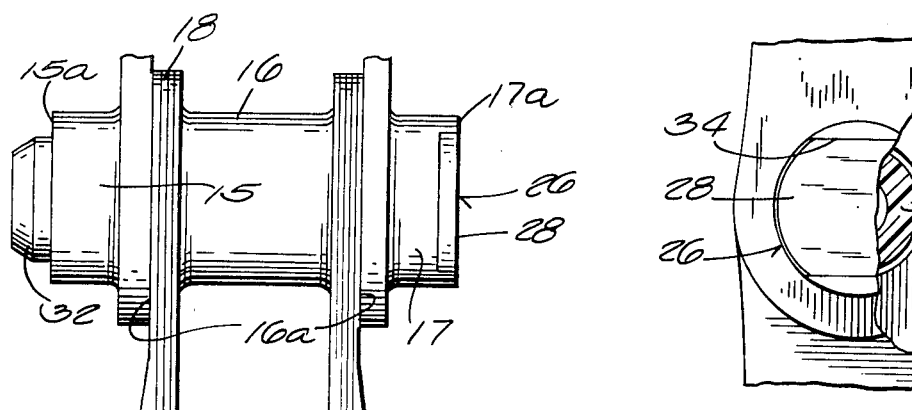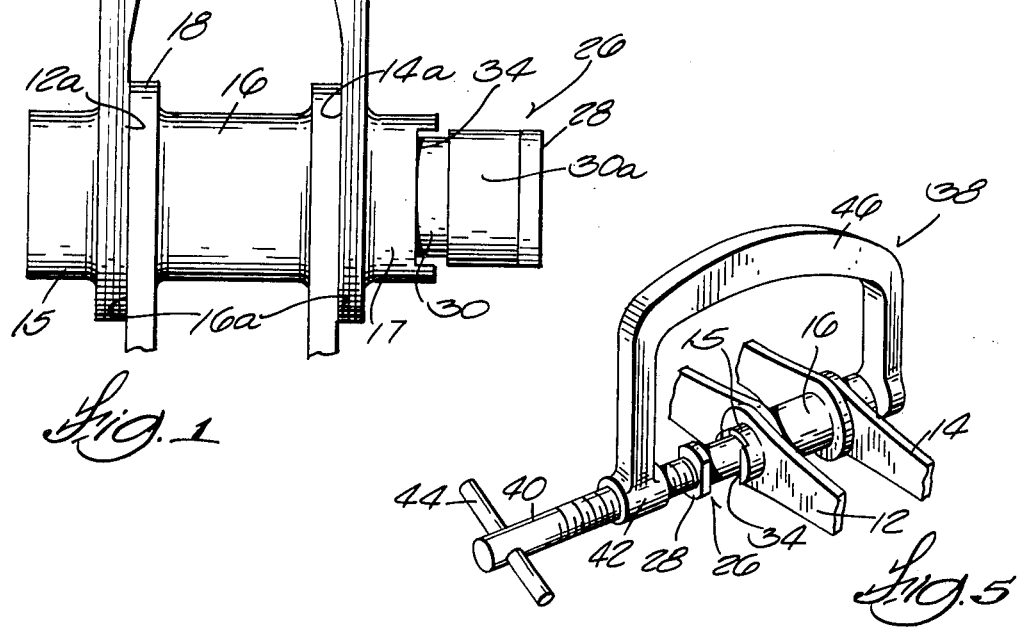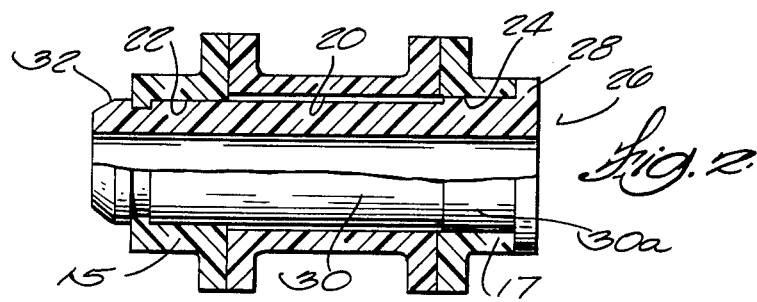

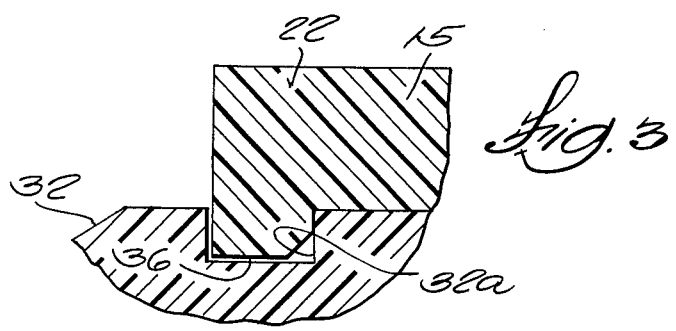
Fig. 3
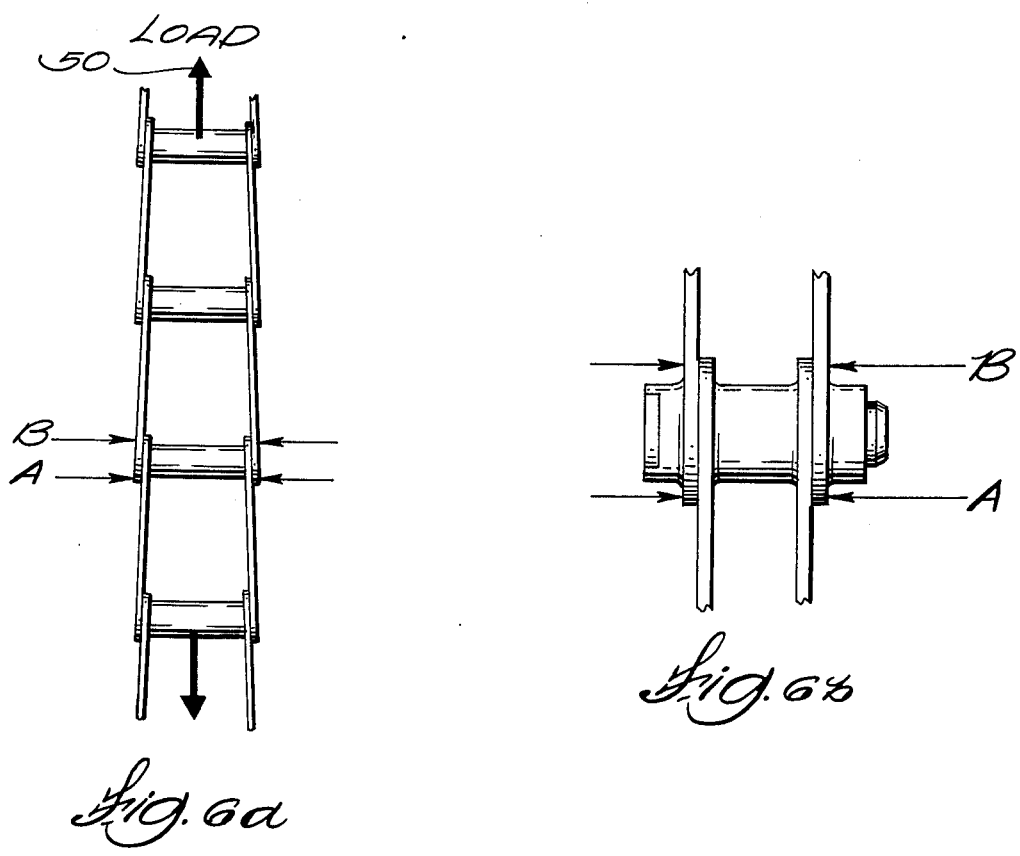
Fig. 6a
Fig. 6b

NON-METALLIC TRANSMISSION CHAIN

BACKGROUND OF THE INVENTION

1. Field of the Invention

The present invention pertains to high load transmission chains and, particularly pertains to a high load transmission chain made completely of non-metallic materials.

2. Discussion of Prior Art and Problems

The substitution of non-metallic for metallic materials is often desirable for many well-known reasons too numerous to entail. Making a choice of a precise material for a particular application from the great many materials which are available, however, is extremely complex since the lightness, various moduli, and other physical characteristics of non-metallic materials pose severe and often unexpected problems to the applications engineer. The problem is no less severe to the engineer wishing to substitute non-metallic materials for chain. Rigid constraints are placed upon the selection, for example, by the environment in which the chain is to be used and the magnitude of the loads acting upon the chain.

Numerous patents have issued that describe chains at least a part of which are made from non-metallic materials. For example, U.S. Pat. No. 3,281,121 describes a chain made from an electrically non-conductive material such as a plastic marketed under the name of "Delrin." The patentee readily admits that while it is preferable that the side plates and pins are metallic, each could be made of a dielectric material also. Unfortunately, the patentee also acknowledges that the pin must be substantially larger to obtain the same strength characteristics of metal components. Obviously, a large load on a chain with a dielectric pin would cast doubts on the viability of a dielectric pin, particularly in sustained operation. Consequently, it is generally preferred to use a metallic pin even when employing non-metallic links.

Another patentee in U.S. Pat. No. 3,127,980 discloses a drive chain comprised of plastic material, primarily for use with conveyor belts for bakery products. The desirability of using a chain that would not tend to contaminate the product is apparent. The links are made of a plastic material. The patentee's chain did not employ pins but the links thereof were connected by bosses and holes alternating in each link end. The resilience of the material was utilized to spread the side arms of the links to place the bosses in the hole. This patent again illustrates the practice of using non-metallic chains, but only when large loads are not expected.

Solutions of the problems as set forth by, for example, the patents discussed above are not readily transferrable to other problems confronting those skilled in the art of manufacturing and using chain. In the present situation, it was desired to fabricate a chain of light weight material which would function as well as metallic counterparts under heavy loads in environments hostile to metals, ie. corrosive solutions and high humidity. Long service life was definitely needed. Non-reactive plastic materials appeared to be the partial answer, but would have to withstand the expected large loads. Yet the known prior art was devoid of any practical answers to the problems created by the high load requirements operating in corrosive environments. It was with the above constraints in mind that applicants sought to provide a chain which at once would stand high loads and operate in environments under which cast chain would deteriorate.

SUMMARY OF THE PRESENT INVENTION

The present invention pertains to a non-metallic chain for high loads comprising (a) a plurality of links each having a barrel with an axially extending bore, said barrel connected to a pair of spaced side arms extending outward from said bore and having openings co-axially aligned with the bore of the barrel of the next adjacent link, said links being comprised of a material having a tensile strength of at least 8500 psi and creep value of less than 2.0% in 10 years at a stress of 2000 psi; (b) a plurality of pins each of which is adapted to extend through said barrel and said openings, said pin being made of a glass fiber reinforced polymeric material having a tensile strength of at least 18,000 psi, a flexure modulus of not less than 1,000,000 psi, a creep value of less than 0.5% in 1 year at 2,000 psi, and a dimensional change from moisture absorption essentially the same as the link material; and (c) means existing as cooperating structure on both said links and pins for releasably locking said pin against longitudinal movement while housed in the bore of said barrel.

BRIEF DESCRIPTION OF THE DRAWINGS

FIG. 1 is a plan view of a chain constructed in accordance with the present invention;

FIG. 2 is a side sectional view taken through the barrel of the chain shown in FIG. 1;

FIG. 3 is an enlarged sectional view of the chamfered circular wedge and associated channel in the pin housed within a link bore;

FIG. 4 is an end view, partially in section, of the chain pin;

FIG. 5 is a perspective view of a chain assembly-disassembly tool;

FIG. 6a is a schematic of a chain under load;

FIG. 6b is a plan view of a portion of chain illustrating points at which flexure measurements were made.

DESCRIPTION OF THE PREFERRED EMBODIMENT

FIG. 1 depicts a plan view of a portion of a chain assembly constructed in accordance with the invention. Each chain link 10 has a pair of spaced side arms or bars 12,14 extending from the ends of an integral cylindrical barrel 16 and diverging or curving outward from the barrel ends. The arms 12, 14 as shown have a thicker portion intermediate to the ends. Both lateral surfaces of each side bar may be curved as desired to provide a long and wide wearing shoe. During operation the load is distributed over the wider curved area and, consequently, provides a longer life for both the chain and sprockets.

The end surfaces 16a of barrel 16 are flat and extend outward as part of flanges 18 beyond the cylindrical surface of barrel 16.

A bore 20 axially oriented communicates with each end surface 16a. Side arms 12,14 have inside flat surfaces 12a, 14a with bores 22,24 extending through the ends.

Side bars 12,14 are constructed so that each turn inwardly so that separation between surfaces 12a,14a being slightly less than the distance between end surfaces 16a. A slight force is therefore necessary to place surfaces 12a,14a over the associated surfaces 16a. The inward bias of side bars 12,14 and the large complimentary flat surfaces may provide, if desired, a snug fitting with an effective seal against grit and abrasive materials.

A pin 26 is positioned within bore 20 and associated bores 22,24 of side arms 12,14. As best seen in FIG. 2, a side sectional view of pin 26 within the associated bores, pin 26 has a head end 28, a cylindrical body 30, and a point end 32. A portion 30a of body 30 positioned within bore 20 has an increased diameter for reasons discussed more in detail below. The gap between the body 32 of pin 26 and the walls of bore 20 can be seen in FIG. 4, a end view of pin 26 with a portion cut away for a sectional view. In FIG. 1, pin 26 is illustrated as partially inserted into the associated bores for clarity.

On the side opposite to surfaces 12a,14a are a pair of bosses 15,17 through which bores 22,24 extend. Boss 17 has a recess 34 which has a non-circular shape complimentary to the shape of pin head 28. Once the pin is forced into the bore, head 28 is restrained from rotation by recess 34. Each boss has a planar end surface 15a,17a extending about the associated bore that provides a utilitarian purpose to be described in reference to FIG. 5.

Before describing more specific structure, it is thought to be appropriate to mention that one of the greatest drawbacks to cast chain is the effort required to assemble and disassemble it. While this is true even when assembling new chain, the effort grows in magnitude as the chain becomes corroded. For example, those who find it necessary to retension chain can testify to the many "downhours" of the entire assembly as maintenance crews burn off the chain pin at the pin lock, heat and expand the link side bar at the head of the pin, and then drive pin out of the bores with a drift pin and sledge hammer.

Applicants, however, have determined that while much of the above is eliminated through use of an entirely non-metallic material, further reductions in chain assembly and disassembly time can be made by a lock feature utilizing structure of pin 26 and one of the side arm bores. As seen in FIG. 2, pin 26 has a tapered region 32 toward its point end and has a circumferential channel 35 slightly short of the tapered region 32a. A complimentary finger or wedge 36 extends circumferentially about one end bore 22 of link bar 12 receiving the leading edge of pin 26. As best seen in FIG. 3, wedge 36 is chamfered along its edge which first contacts the pin. An enlarged view of chamfered portion 32a within channel 35 is illustrated by FIG. 3. The taper of pin 26 and the chamfered edge 32a facilitates entry of the pin into link bore 22 and of wedge 36 into the channel 35. Removal of pin 26 from bores 22 and 24 requires considerably more force than that required for entry into bores 22 and 24. The snap-lock feature eliminates the longitudinal movement of pin 26 within bore 20 and bores 22,24.

As discussed before, because the flexibility of polymeric materials is ordinarily much greater than metallic materials, flexing of side arms in high load applications becomes a problem with which users must reckon. Not only is material fatigue a significant factor, but in some instances severe flexing could cause the pin to pop out of the bores. Increasing the thickness of the side bars is not a solution since the flexure modules of metallic materials is on the order of 30 times greater than plastics. For example, to approach the stiffness of cast iron links of 6 millimeters thickness, one would have to have a thickness of 19 millimeters for an average acetal resin. Composite materials might be an answer but again one must take into consideration cost and undesirable side effects.

Applicants have unexpectedly found a means to reduce flexing (and the need to employ thicker side arms for most normal loads) by translating to non-metallic chains a technique sometimes called "interference fitting." In cast chain, the use of interference fitting is sometimes employed to ensure the pin does not move out of the bore due to vibration. In essence, an interference fit is simply obtained by fabricating the pin diameter slightly larger than the bore of the barrel or links. The diameters are very close in size, but still considerable force is needed to move the pin longitudinally once housed within the bore.

Since the side arms of cast links are virtually unflexible, there is no danger of pin pop-out. Most pin movement is due to vibration. Usually, in large load applications, cotter pins through the chain pin are sufficient to prevent pin movement. Consequently, it is often considered redundant to also use interference fitting.

However, applicants have found that collective effect of pin composition (described hereinafter) and interference fitting provides a side arm stiffness which approaches that of cast chain without the need of expensive light-weight compositions or thicker side arms. FIG. 2, in particular, illustrates the structure which may be used to provide this result. As depicted, pin body 30 has a region of increased diameter 30a from near head end 28. Bore 24, on the other hand, is provided a diameter slightly less than the diameter of body 30a. Preferably, the diameter of bore 24 should be not less than about 1.0% smaller than the diameter of body 30a. Bore 22 and the portion of pin body 30 housed within should have a similar relationship. As shown, the bore 22 has a smaller diameter than bore 24 to compensate for the smaller diameter of pin body 30 in this region.

Apparently, the interference fit reduces the bending length of pin 26 by fixing it between the facing mouths of bores 22 and 24, i.e., between the inner surfaces 12a, 14a. Otherwise, the load pulling on the barrel riding against a pin loosely fitted within one link bore would cause the pin to bend over a longer length. The deflection of the side bars would then be correspondingly greater.

The side bars illustrated in FIG. 1 are depicted as being thicker in the middle to provide a larger wearing surface. The precise thickness of each side bar (as with cast materials), however, is now a matter of preference because of applicant's contribution and largely depends upon the particular use for which the chain is designed. Within practical limits, the thickness of the side arms is made less critical by the invention as set forth herein.

Referring now to FIG. 5, it may be seen that a tool generally noted as 38 is being employed to push pin 26 into bore 20 and associated link bores. Tool 38 is a simple, one man operated device having a partially threaded bolt 40 which screws into an internally threaded housing 42 when handle 44 is turned. One end of bolt 40 engages head 28 of pin 26. Housing 42 is attached to one leg of U-shaped bracket 46. The other leg of bracket 46 ends in an annular surface which fits directly over and against the other boss (as illustrated boss 15). Removal of pin 26 can be accomplished by reversing the tool.

The primary purpose of the discussion above is to illustrate the ease by which the chain, as disclosed herein, may be assembled and disassembled. Although the chain is constructed for high loads, the ease by which the chain is disassembled is apparent in contrast to cast chain counterparts. Additionally, the time spent to disassemble is decreased considerably, often on the order of a magnitude.

When applicants were investigating various compositions that might be utilized as candidates for the links, it was observed that the prior art in many instances chose an acetal polymer marketed under the trademark "Delrin", a product available from DuPont. It was found that links made of this material or other similar materials performed satisfactory if various physical characteristics are maintained within certain limits. Tensile strength and flexure modules are obviously important considerations. For the high loads for which the present chain disclosed herein is designed, it is necessary that the material have a tensile strength of at least 8,500 psi and a flexure modulus of at least 370,000 psi. It is also essential that materials be chosen having dimensional expansion from moisture absorption not beyond about 0.4%, particularly when the chain is to be used in water or a high environment.

Another important factor is the "creep" value. Many compositions will become permanently distended after a period of use. The creep value is a measure of this distention or stretching and is defined as strain over a period of time due to the effect of a constant load. We have determined that it is important to select a material having a creep value of less than about 2.0% in 10 years at a stress of 2,000 psi.

Unfortunately, pins made of material such as Delrin did not function well at all. While the precise reasons are not completely understood, applicants believe the following simplified explanation may apply and be helpful in appreciating the surprisingly complex nature of the combination needed for a functional non-metallic chain. When non-metallic chain is placed under load, the pin undergoes a deformation which can be large or small, depending upon its composition. The deformation takes the form of bending of the pin. The bending of the pin resulted in an unexpected flexing of the side bars. As stated before in the discussion of interference fitting, chains of metallic material undergo no observable flexing of the side bars. Each time the chain is loaded, as occurs between the drive and driven sprocket, the pin bends and as applicants have determined, causes the side bar to distort. Once past the driving sprocket, the chain is unloaded and the pin/side bars relax. The repititious distortion/flexing while small has a deleterious and cumulative effect on the side bars and, after a period of time, failure may occur. This particular problem and not previously been encountered in prior art since most applications of non-metallic chains have been in the low load region. Additionally, those using non-metallic chains preferred steel or other metal alloy pins.

Applicants, however, found that the free ends of the side bars of the link are forced outwardly when a load is applied in a conventional manner. This is believed to be due directly to the bending of the pin. To illustrate this, a series of simple tests were conducted, the results of which are tabulated in the Table.

Initially a cast iron chain and steel pin having the commercial designation of CS720S was tested. Such a chain is available commercially from Rexnord Inc. of Milwaukee, Wisconsin. A non-metallic chain of essentially the same dimensions was then fabricated via an injection molding process from an acetal resin such as Delrin. Two chain pins were then made, one from the same material and the other from a 43% glass filled 612 nylon marketed under the trademark Zytel also available from the DuPont Company.

Each chain was measured at points A and B (see FIGS. 6a and 6b) for deflection under loads of 1000 and 2000 lbs. The non-metallic chain was measured using both type pins. FIG. 6a illustrates a load force acting in the direction depicted by arrow 50 on a chain. The precise location of the points at which measurements were taken are seen in FIG. 6b as points A and B.

The results of some measurements may be seen in column A of the Table which corresponds to measurements taken at Point A of FIG. 6b. At Point B, the side bars may move inwardly under certain conditions. The precise reason for this is not completely understood. As seen in the Table, no measurable movement of the side arms was observed for cast iron chain. When using the Zytel pin some flexing of the side arms was observed. This, however, must be compared to the two fold increase in flexure when using a Delrin Type of pin. Obviously, the flexing due to the latter is highly undesireable as the previous discussion has made clear.

When the side arms of the chain were made thinner by about 50%, additional measurements were made. It was determined that there was no statistical difference between the flexure of the side arms between thin side bars and the regular side bars when employing the pin of the present invention. This appears to substantiate the benefits derived from the pin composition and interference fit. On the other, an increase in flex of the side arms was noted with the thin side bars utilizing pin made from Delrin-like materials.

Many other polymeric materials have been investigated as possible compositions for the pin. Still applicants did not expect glass or other filled polymeric materials to work in a chain system since such materials are well known to wear, abraid, or groove more rapidly than non-glass filled polymeric materials. Links constructed of glass filled polymeric materials have demonstrated decide wear as the link barrel has engaged the sprocket teeth. The sprocket wheels gouged out the glass material leaving a roughened surface which accelerated wear and further deterioration.

It was applicant's good fortune to determine that certain glass filled polymeric materials did indeed work well. Not only did pins made of such material withstand the large load requirements, but additional abrasion was low and the flexing of the side arms was decreased.

While other fabricating processes can be utilized, it was determined that the most expedient method of fabricating links was through injection molding. The gate to the mold can be done at any convenient location. One preferable location is along the longitudinal center line of the links" inner surface.

Table

| | | (Flex - 1000 × inch) | | | | | |
|---|---|---|---|---|---|---|---|
| | | Pin | | | | | |
| | | Acetal Resin[1] | | Glass Filled Polyamide[2] | | Steel | |
| Link Material | Load Lb. | A | B | A | B | A | B |
| Cast | 1000 | — | — | — | — | No Deflection Observed | |
| | 2000 | — | — | — | — | | |
| Acetal Resin | 1000 | 13 | — | 11 | 0 | — | |
| | 2000 | 33 | 7 | 16 | 5 | — | |

[1]Delrin
[2]Zytel

Because of the fiber content of the pin, it would not be expected that any injection molding process would be suitable unless gating could be arranged for more random orientation of the fibers. The fibers otherwise tend to orient themselves along the direction of flow. Ordinarily, orientation of fibers in molded plastics tends to create more opportunity for the occurrence of abrasion between relatively moving surfaces. Unexplainably, glass fiber reinforced "Zytel" worked best as a pin when gating was performed at one end to provide axially aligned fibers. Even after extended operations, abrasion of the surface of the "Zytel" pin or bore surfaces was undetected.

In molding the pin, it is generally desirable to maintain the wall thickness of the pin about 0.25 inch (6.35 millimeters). Larger wall thicknesses are susceptible to faults caused by bubbling and other shrinkage voids. Thinner walls cannot withstand the large loads. Additionally, it was found desireable to match the dimensional expansion due to moisture absorption of the link material. The tensile strength and flexure modulus of the pin must also be greater than that of the link material. Specifically, it was determined that strength and modulus beyond 18,000 psi and 1,000,000 psi respectively were needed. Any values less do not appear to provide the strengths needed to reduce flexing of the side arms. The creep value must be less than that of the link material to ensure the rigidity of the side arms is maintained. A value of less than about 0.5% in a one year period at 2000 psi is considered important. While the most preferred material is glass-filled 612 nylon, others such as glass coupled acetal marketed under the tradename Celcon available from the Celenese Company may be used.

Applicants have attempted to describe in detail the problems and ensuing solutions uncovered in developing the requisite chain. In so doing, certain behavior of the material used was also described although applicants acknowledge that a complete understanding is not available at this time. Others, after reading the disclosed material, may recognize more thoroughly the reasons why certain combinations described herein work well. Through the appended claims, however it is applicant's intention that the spirit of the invention be measured and limited only by the scope of the claimed language.

We claim:

1. A non-metallic chain for loads comprising:
   (a) a plurality of links each having a barrel with an axially extending bore, said barrel connected to a pair of spaced side arms extending outward from said bore and having openings coaxially aligned with the bore of the barrel of the next adjacent link, said links being comprised of a material having a tensile strength of at least 8500 psi and creep value of less than 2.0% in 10 years at a stress of 2000 psi,
   (b) a plurality of pins each of which is adapted to extend through said barrel and said openings, said pin being made of a glass fiber reinforced polymeric material having a tensile strength of at least 18,000 psi, a flexure modulus of not less than 1,000,000 psi, a creep value of less than 0.5% in 1 year at 2000 psi, and a dimensional change from moisture absorption, essentially the same as the link material, and
   (c) means existing as cooperating structure on both said links and pins for releasably locking said pin against longitudinal movement while housed in the bore of said barrel.

2. The drive chain of claim 1 in which said pin is made from a glass-filled polymeric material comprising a group consisting of 612 nylon and acetal copolymer.

3. The drive chain of claim 1 in which said pin is injection molded with an axial extending bore and a wall thickness not exceeding about 0.25 inch, said glass fibers being essentially axially oriented.

4. The chain of claim 1 in which said locking means includes a circumferential channel about the periphery of the leading edge of said pin and a chamfered wedge about the surface of one bore of said side arms.

5. The chain of claim 4 in which said side bars have bosses on the outside surface thereof about the bore, said bosses being of substantial equal dimensions and having annular flat surfaces adapted to receive an annular surface, whereby said flat surfaces provide a mounting surface for the surface of a tool to remove or insert the pin.

6. The chain of claim 1 including means for constraining the movement of the side arms relative to the longitudinal axis thereof when under load.

7. The chain of claim 6 in which said means includes a interference fit between said side bars and said pin.

* * * * *